March 29, 1966     A. L. TOWLES     3,243,657
GROUND FAULT PROTECTIVE MEANS

Filed Dec. 3, 1963     2 Sheets-Sheet 1

INVENTOR.
Arthur L. Towles
BY
Horton, Davis, Brewer & Brugman
attys.

March 29, 1966 — A. L. TOWLES — 3,243,657
GROUND FAULT PROTECTIVE MEANS
Filed Dec. 3, 1963 — 2 Sheets-Sheet 2
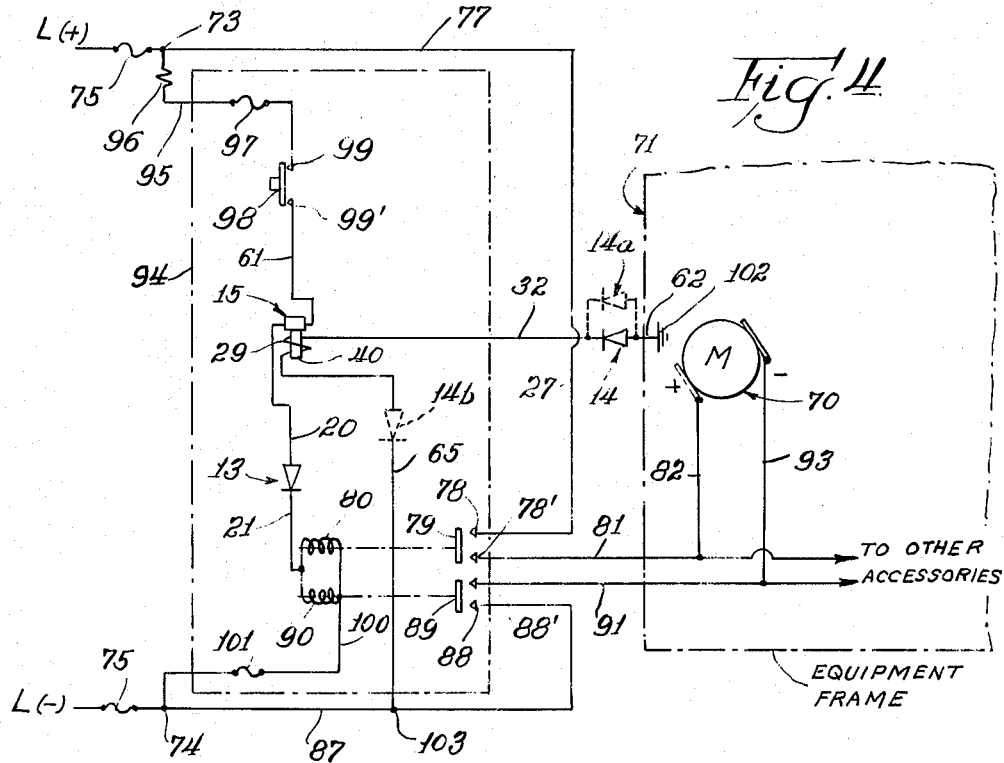
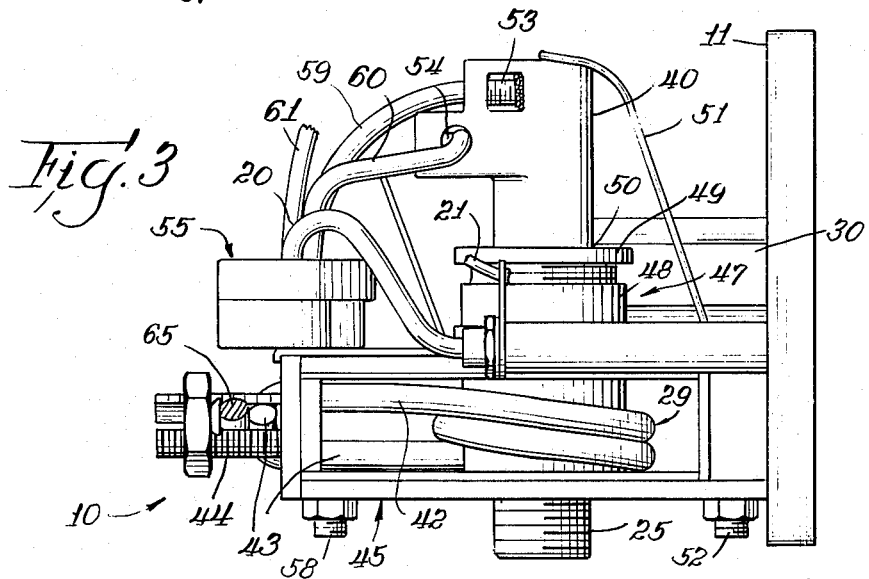
INVENTOR.
Arthur L. Towles United States Patent Office 3,243,657
Patented Mar. 29, 1966

3,243,657
GROUND FAULT PROTECTIVE MEANS
Arthur L. Towles, Marion, Ill., assignor to Bell & Zoller Coal Company, Chicago, Ill., a corporation of Illinois
Filed Dec. 3, 1963, Ser. No. 327,631
11 Claims. (Cl. 317—18)

This invention relates generally to electrical systems and safety means for protecting electrical equipment and operating personnel from ground fault hazards and, more particularly, this invention concerns improvements in such systems and means for direct current electrical mining machinery and like equipment.

For many years the mining industry, in particular, has been seeking a satisfactory and practical means of protecting mine workers from the dangers attending operation of electrically powered mining machinery and equipment. Not the least of such dangers is the hazard of electrical shock from electrical supply systems and electrically powered machinery as familiarly employed in mechanical mining operations. This danger is especially prevalent in mining machinery powered with direct current energy which is of especially high voltage and amperage because of the tremendous energy requirements for extracting material from the earth by machine. In the coal-mining industry this electrical shock hazard is further compounded by the use of mobile electrically powered mining machines. Such machines are generally either mounted for restricted movement along rails or tracks and powered from overhead trolley wire systems, or, more popularly, such are movable freely as ground-engaging wheel vehicles supplied by trailing electrical power cables. Much of this equipment is powered by D.C. energy and due to the environment of its use, which includes such factors as dampness, gaseous atmospheres, tight or cramped quarters, high power requirements and like circumstances, personnel operating such machines are constantly subjected to the dangers of explosion and electrocution by ground faults in both the power cables and the electrical systems of the machines. Ground faults in such machinery and/or trailing cables present especially insidious hazards since they are most difficult to detect and control until dangerous energy levels are reached.

In the past numerous schemes, systems and devices have been presented in an effort to solve the above-outlined problem. To date, the most successful solution appears to have centered about the use of three conductor supply cables, two of which constitute energy carrying supply conductors and the third of which constitutes a neutral grounding conductor. However, three conductor cables of this nature are expensive and are very cumbersome and bulky to handle. Additionally, the conductive continuity of the third wire ground conductor is especially difficult to maintain and determine, which in and of itself constitutes a serious operational hazard because of the need and practice of repairing and splicing such cables. Consequently, whereas it is immediately apparent to an operator of the electrical equipment if either of the power conductors of the supply cable are disrupted because there is an obvious power loss, it is not so simple to determine when or if the third or neutral wire of the cable is broken. Also, in most mines the trailing cables for moble off-track equipment extend from such equipment to a main line supply network to which the cables are detachably joined at selected supply points. Thus, it will be recognized that unless great care is exercised in attaching the third conductor to a neutral conductor of the power supply network, it is quite easy to couple such grounding conductor to the energy sources. This, of course, can be disastrous to a person handling the supposedly neutral or deenergized third conductor. Added difficulty and disadvantage presents itself when using three conductor cables with D.C. energy because of the requirements for maintaining correct polarity in the electrical circuits.

Because of the foregoing and other factors familiar with mining operations, the use of three conductor trailing cables is not popularly accepted in mines.

Other protective means, including so-called "grounding devices," have also been resorted to in the past, but by and large, the same have not proven as satisfactory as the three wire cable system, generally because such devices have been incapable of withstanding the shock, jolting and rough treatment attending mining operations, or because they have not proven operationally dependable for their intended purpose.

The present invention is directed to a new and improved electrical protective system and safety device for obviating the above-described problem. Basically, the improved system and device of this invention combines means operative to deenergize the electrical equipment in the presence of predetermined ground fault energization of the support framing associated therewith. In extreme ground fault conditions, the power supply to the equipment is disrupted. In either event, such protects operating personnel against shock hazard when they come into contact with the frame of the machine. The foregoing protective functions are accomplished with use of a two conductor D.C. supply cable in such a manner that any ground fault energy in the framing of the machine is returned directly to the power supply source over one conductor of the supply cable. In the presence of predetermined values of such ground fault energy in the machine frame, the electrically energized components of the latter are automatically protected and deenergized to shut down operation of the machine. Of added importance is the ability of the present invention to effectively deenergize the supply cable by blowing the main circuit breakers or fuses over which such cable is connected to the major electrical supply network. This is accomplished by effectively short circuiting the power cable conductor if excessive ground fault energy is applied to the machine frame or any other condition occurs to create an effective cable short condition.

Other means are included in the improved system and device of the present invention to prevent energization of the equipment or machinery if the two conductor supply cable is perchance connected in such a manner as to create a reverse or erroneous polarity condition. This effectively protects the motors and other electrically powered components of the machine from the damages attending reverse polarity hook-up.

In general, the present invention comprises a new and improved ground fault protective device and electrical system embodying two or more semi-conductor units, at least one of which is coupled in the control circuit for the equipment sought to be protected and at least one other of which is coupled between the framing of the equipment and one conductor of a two conductor supply cable for the machine. This device is effectively combined in a protective circuit including the main support frame of the equipment to be protected, an over-current device arranged to deenergize the operating circuit for such equipment in response to predetermined ground fault energy flow, the positive and negative conductors of a two conductor D.C. supply cable and the main circuit fuses or circuit breakers over which the latter is joined to the main supply network. These various components are uniquely arranged with the protective device to accomplish the above-outlined objective of protecting both the equipment and the operating personnel against the dangerous hazards of ground fault energy.

The aforementioned semi-conductor units, each preferably comprises a solid-state semi-conductor, such as a silicon diode which are commercially available as assembled sealed units, ready for circuit hook-up. The one diode which is coupled between the frame of the machine and the one conductor of the supply cable is significantly referred to hereinafter as a "ground fault" diode and is required, according to this invention, to conduct the current and voltage values supplied to the machine over the trailing power cable therefor. Depending on the energy values encountered, one or more of such ground fault diodes may be utilized and needed to satisfy this requirement. The diode coupled in the control circuit, according to this invention, on the other hand, is required to carry only the machine's control circuit energy values which normally are significantly less than the voltage and amperage supplied over the power cable.

The utilization of semi-conductor diodes, such as silicon diodes, in a ground energy protective system of the character to which the present invention pertains is significantly advantageous because of the inherent ruggedness and stability of such devices to withstand shock and rough treatment as is frequently encountered in operating heavy mining equipment. Additionally, the basic characteristics of semi-conductor diodes are such that the same exhibit an inherent property of offering very low resistance to flow of electrical energy therethrough in one direction, while presenting a significantly higher resistance to the flow of such energy in an opposite direction. Thus, such devices are, in effect, unidirectional energy valves, and this characteristic is especially advantageous in direct current systems. Adapting this feature and characteristic to the present invention, the diode utilized in the machine's control circuit is significantly capable of permitting energization of such control circuitry under a selected polarity condition, while substantially preventing its operation under a reverse polarity condition. In a like manner, the ground fault diode embodied in the present invention readily permits the flow of ground fault energy from the frame of the machine to the one supply conductor of the power cable, while effectively preventing the flow of energy to the machine frame in a reverse direction. Thus, protection against energizing the equipment frame by inadvertently reversing the polarity of the negative and positive cable conductors at their hook-up with the main supply network or with the machine power terminals is provided according to the present invention.

In the particular preferred embodiment of the present invention hereinafter described, the diode device or means coupled between the main frame of the equipment and one of the supply conductors is in series circuit arrangement with such main frame and the fuse or circuit breaker means interposed between the power supply cable for the machine and its connection with the main power supply network. Such diode means also includes in series therewith the above-mentioned over-current device for deenergizing the equipment control circuit means so that, in effect, ground fault energy applied to the frame of the machine is returned over one of the conductors of the two-conductor power cable via the unidirectional ground fault diode in series therewith and the over-current device in the control circuit. Such over-current device is intentionally limited to operate for deenergizing the machine's control circuit in the presence of a preselected maximum value of ground fault energy flowing from the machine's frame to the power cable; such preselected value being significantly selected to insure safety of operating personnel coming into contact with the machine frame. Further, while it is normally preferable that protective devices of the class to which the present invention pertains be housed in an explosion-proof enclosure, when used for protecting underground mining machinery, in order to avoid explosion hazard, the protective device and system of the present invention exhibits a novel capability of satisfying the explosion-proof requirement without resort to an explosion-proof enclosure therefor, although it is adapted for use with such an enclosure, if desired.

The main object of this invention is to provide a new and improved safety device and system for protecting electrical equipment and operating personnel from ground fault hazards.

A further object of the present invention is to provide a new and improved protective system and device, as aforesaid, which utilizes semi-conductive diode devices.

Still another important object of this invention is to provide a new and improved ground fault protective system and device for direct current energized equipment which is capable of deenergizing such equipment in the presence of preselected ground fault values applied to the support framing therefor.

Still another object of this invention is to provide an improved ground fault protective device, as set out in the immediately preceding objective, which protects the equipment against the damaging effects of reversed polarity hook-up.

A still further and important object of the present invention is to provide a new and improved electrical system and device for protecting heavy electrical machinery and equipment which is energized over a two conductor, direct current power cable.

Another important object of this invention is to provide an improved ground fault protective device and system which is simple to construct, easy to maintain and is dependable in operation.

Having thus described the present invention, the best mode presently contemplated for enabling those skilled in the art to make and use the same will now be described in conjunction with a preferred embodiment thereof illustrated in the accompanying drawings.

In the drawings:

FIGURE 3 is a side elevational view thereof; and

FIGURE 4 is a schematic circuit diagram illustrating the improved protective system of the present invention.

Figure 1:
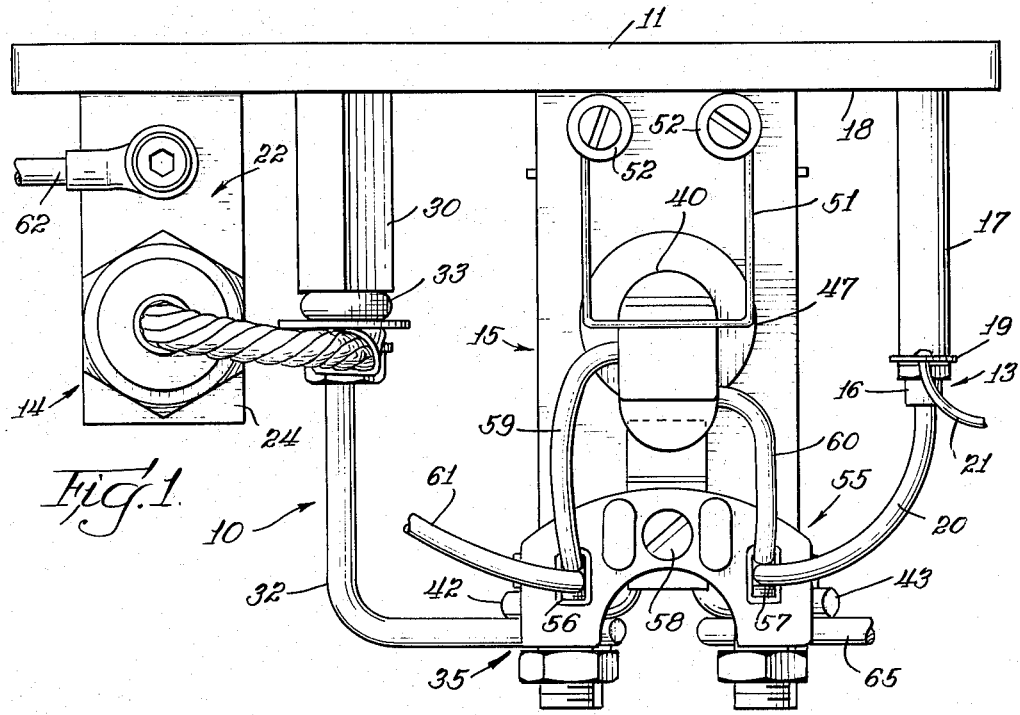
FIGURE 1 is a top plan view of a protective device according to the present invention.
Figure 2:
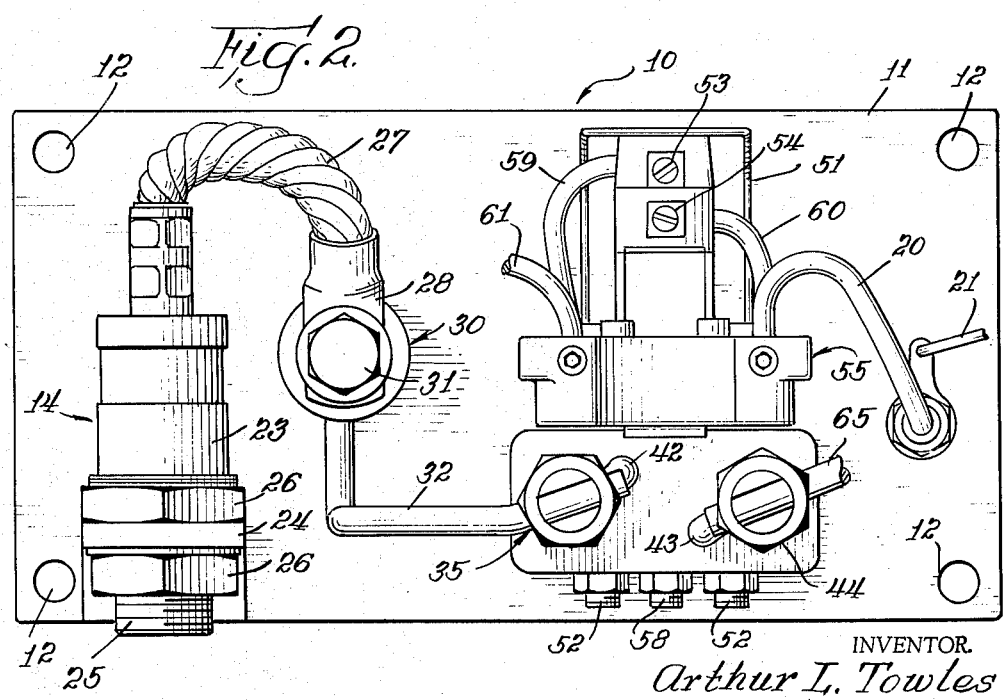
FIGURE 2 is a front elevational view thereof.

Turning now to the features of the improved protective device according to this invention which is indicated generally at numeral 10 in FIGURES 1–3 of the drawings, it will be understood that the same comprises a rectangular mounting panel 11 which is intended to be positioned generally upright in use and which is preferably made of a non-conductive or electrical insulating material. Mounting panel 11 is adapted to be mounted on a mining machine or similar piece of electrical equipment, which is to be protected, by means of a plural mounting bolts (not shown) adapted to pass through openings 12, 12 provided adjacent the four corners of panel 11. Panel 11 supports various electrically operable components including a control circuit semi-conductor diode device, indicated generally at 13, a ground fault semi-conductor diode device 14 and an over-current protective device 15, all of which are adapted to be incorporated in the protective electrical system of this invention.

The semi-conductor device 13 is provided for the purpose of preventing operation of the electrical equipment to be protected by device 10 under reverse polarity conditions of D.C. energization. As such, device 13 preferably is related to the control circuit of the mining machine by suitable electrical circuit means in the manner indicated in FIGURE 4, as will be described in greater detail hereinafter. According to the intents and purposes of polarity protecting diode device 13, the same preferably comprises a commercially available silicon diode rectifier unit having a rating sufficient to accommodate the electrical energy flowing through the control circuit of the machine. As illustrated, the device or unit 13 includes an outer protective housing 16 in which the semi-conductor diode element is sealed. Housing 16 is supported on the outer end of a mounting post 17, affixed at one end to the mounting panel 11 so as to project forwardly of the front face 18 thereof. Circuit connective means for electrically coupling the diode elements of device 13 for operation include a connective terminal lug 19 and an insulated connective lead 20 (see FIGURE 2). Terminal lug 19 is adapted for soldered connection with a circuit conductor 21 related to the machine's control circuit, while lead 20 is joined to the current overload protective device 15, as will be explained in detail presently.

Semi-conductor device 14 also preferably comprises a silicon diode, but it is of substantially greater size, capacity and rating than diode 13 to enable the same to carry full line voltage and current as supplied to the mining machine to be protected by device 10. Diode 14 is also supported on panel 11 forwardly of face 18 thereof by means of an electrically conductive L-shaped mounting bracket 22 which is affixed in a cantilever fashion to the insulating mounting panel 11 by suitable connective means, such as mounting screws or the like (not shown).

It will be recognized from FIGURES 1 and 2 in particular that diode device 14 includes a protective housing 23 in which the semi-conductor elements are sealed, the same being mounted upright near the outer end of cantilever arm portion 24 of the mounting bracket 22. In greater particular, the housing 23 has a lower threaded stud portion 25 comprising one circuit connective terminal which passes through an opening formed through the mounting bracket arm portion 24, the unit being locked to such arm portion by lock nuts 26, 26, as shown best in FIGURE 2. A heavy braided cable conductor 27, having a terminal lug 28 at its free end, extends from the upper end of the unit 14 to couple the latter in circuit with activating means or coil 29 for the protective device 15, as will appear hereinafter. To this end, the connective terminal lug of cable 27 is attached to a mounting post 30 extending outwardly of the insulated mounting panel 11 by connective bolt means 31. A heavy electrical conductor 32 is provided with a connective loop portion 33 at one end thereof which is attached to the mounting post 30 in electrical contact with the lug 28 of diode conductor 27. The other end of conductor 32 is inserted into terminal post 35 associated with the over-current protective device 15 to provide circuit connection between diode unit 14 and the protective device 15.

The over-current protective device 15 preferably constitutes, as shown, a mercury relay having a hermetically sealed, mercury containing relay tube or envelope 40 and an activating means therefor constituting the operating coil 29 (see FIGURE 3). Coil 29 surrounds the relay envelop 40 and has one terminal end portion 42 thereof coupled to the terminal post 35 of unit 15 so as to be in electrical circuit relationship with conductor 32 and the cable conductor 27 of the diode unit 14. The other end 43 of coil 41 is connected to a second connective terminal post 44 of the protective device 15.

The mercury relay envelope 40 and operating coil 29 therefor are suitably supported by a substantially U-shaped mounting bracket means 45 which is attached in cantilever fashion to mounting panel 11. Means for adjusting the vertical positioning of envelope 40 with respect to the turns of coil 29 are indicated generally by numeral 47 (see FIGURE 3), such constituting an annular collar 48 and a threadingly related adjustment ring 49. Ring 49 engages a shoulder portion 50 formed intermediate the ends of the relay envelope 40 to regulate the vertical position of the envelope 40 in response to threading movement of ring 49 in collar 48. This serves to adjust the axial position of the relay envelope in coil 41 to regulate operational response of the relay plunger which displaces mercury within envelope 40, thereby controlling the circuit connection between separated contacts, according to known practice.

A U-shaped spring means 51 is held by screw members 52, 52 to the mounting bracket 45; the spring extending upwardly over the top of envelope 40 to hold the latter in place. The relay envelope 40 also is provided with contact terminal connectors 53 and 54 adjacent its upper end for effecting circuit connection with the relay contacts. A relay terminal block 55, having insertion-type terminal connectors 56 and 57 is attached to the bracket 45 by bolt connector means 58 (see FIGURE 1). An electrical conductor means 59 extends between the terminal block connector means 56 and the one relay contact terminal 53, while a similar conductor 60 joins the other relay contact terminal 54 with the terminal connector 57 of the block 55. In this regard, it will be noted that the connective lead or conductor 20 for diode unit 13 is coupled to relay contact conductor 60 at the terminal connector 57, as illustrated in FIGURES 1–3.

In order to connect the device 10 in protective relationship with electrical equipment or machinery to be protected, such as a mining machine, the mercury relay contacts within envelope 40 are coupled in series with diode unit 13 and the operating control circuit for the mining machine. Such circuit connection is accomplished by means of the conductor 21 which is joined to the terminal lug 19 for diode 13 and an additional conductor 61 leading from terminal connector 56 of the relay terminal block 55.

In order to couple the large ground fault diode unit 14 in the ground fault circuit, the threaded stud portion 25 of the diode unit constitutes one electrical terminal thereof and, as aforenoted, such is joined to the electrically conductive mounting bracket 22, which also functions as a heat sink to depress the operating temperatures of the diode unit 14. Bracket 22 in turn is electrically coupled to a heavy insulated conductor 62 which is preferably joined directly to the frame of the mining machine. Circuit through unit 14 therefore includes, in series, the diode of unit 14, the diode lead 27, conductor 32, relay coil terminal connector 35, the relay coil 29 and the other relay coil terminal connector 44. A heavy conductor 65 extends from the latter terminal connector to one of the power cable conductors; such as the negative conductor of the power cable for the mining machine. Alternatively, conductor 65 may be coupled directly to the machine frame, with conductor 62 then being connected to one of the power cable conductors. In such an alternate arrangement, however, the polarity of diode unit 14 must be reversed to insure unidirectional flow of ground fault energy from the machine frame to the power cable. This is easily accomplished by selecting a diode of the requisite polarity to accomplish the desired electrical hook-up while maintaining diode unit 14 mounted stud end downward, as shown in FIGURE 2.

Having thus described the various components which go to make up the improved protective device 10 of this invention, its adaptation and use in a protective electrical system will best be understood by reference to the schematic circuit diagram of FIGURE 4. As indicated in that figure, a mining machine or similar piece of equipment to be protected is schematically symbolized by the indicated motor 70 mounted on an equipment frame 71. In this respect, it will be understood that the motor 70 is only indicative of a power load which, in a typical electrical mining machine, comprises several electrical motors and other related electrical components and accessories. Typically, the mining machine motor 70 is supplied with direct current energy over a two-conductor trailing power cable, as previously mentioned, the same being indicated by and comprising two line conductors L(+) and L(−) which are coupled to the mining machine at its circuit connective input and output terminals 73 and 74, respectively. Each of the power cable conductors includes a line fuse or overload circuit breaker 75 over which the conductors of the trailing power cable are coupled to the main power supply network. In a typical installation the D.C. energy supplied to the mining machine over the trailing cable will be in the order of 250–300 volts and substantially 200 amps.

From the positive input terminal 73 operating circuit conductor 77 leads to a pair of operating circuit control contacts 78, 78' adapted to be closed by a movable relay contact 79 operationally responsive to energization of a relay operating coil 80 or the like. Conductor 81 leads from one contact 78' to various electrical accessories mounted on the mining machine proper, while circuit connection between the symbolized motor load 70 and conductor 81 is made over conductor 82.

In a similar manner, the negative line conductor of the power cable is joined at output terminal 74 to line conductor 87 of the main operating circuit for the mining machine. Conductor 87 is joined to one of a pair of relay contacts 88, 88' which are adapted to be bridged or closed by a movable relay contact 89, operationally responsive to the energization of operating coil 90 therefor. Contact 88' is in circuit with a connective return conductor 91 comprising the return side of the supply circuit for the various accessories and motor loads of the mining machine; the symbolized motor load being joined thereto over negative conductor 93.

From the above it will be appreciated that with power supplied to the terminals 73 and 74 of the mining machine, the motor and other electrical accessories thereof will be energized when the movable relay contacts 79 and 89 are closed with their respectively associated operating circuit contacts 78, 78' and 88, 88', respectively, thus conditioning the mining machine for operation.

Control of the mining machine operating circuit above described is effected by a suitable control circuit mounted within central enclosure, indicated by broken lines at 94. Such control circuit includes, in series relation, a control circuit conductor 95, having resistance 96, control circuit fuse 97 and control switch 98, herein symbolized as a manually-operated on-off switch adapted to bridge spaced control circuit contacts 99 and 99'. Conductor 61 leads from one contact 99' to the input side of or contact means within the mercury relay envelope 40 of the overload protective device 15. As previously described, the other contact of the relay 40 is joined to conductor 20 associated with the control circuit diode unit 13 of the aforedescribed protective device. Conductor 21 leads from the other end of diode 13 to operating coils 80 and 90 which are in parallel circuit relation, as shown. Circuit from coils 80 and 90 to the negative or return power supply conductor L(—) is completed over conductor 100 having a protective fuse 101 therein, which is joined to the negative side of the power supply, as at the negative output terminal 74 of the mining machine to complete the control circuit.

It will be appreciated that upon closing the control switch 98 with its contacts 99, 99', energization of the control circuit follows; the contacts of mercury relay 40 being normally closed and of quick-opening type. Energization of the control circuit, of course, also serves to energize the operating coils 80 and 90 to close the relay contacts 79 and 89 with their respectively associated contacts in the operating circuit. This permits energization of the motor load 70 and operating circuit to place the mining machine in operation. In regard to the control circuit, it will be noted that the diode unit 13, as symbolized therein, effectively requires a preselected proper polarity hook-up of the power cable conductors L(+) and L(—) so that energy will flow from plus to minus in both the control and operating circuits for the mining machine. If perchance the polarity of the cable conductors is somehow reversed, as by splicing or reversing their hook-up at the input connector terminals 73, 74 of the machine, or elsewhere, the unidirectional energy flow control provided by polarity dictating diode unit 13 will effectively prevent energization of the machine's control circuit and consequently, will prevent the movable relay contacts 79 and 89 from closing the operating circuit for the motor load 70. In a typical situation, diode unit 13 may be in the order of a 10 amp. silicon diode rectifier having a 250-volt peak reverse voltage rating; the control circuit typically operating at 250 volts, 10 amps. D.C.

In order to effectively protect the operating personnel from the excessive hazards of ground fault energy applied to the main frame 71 of the mining machine, the conductor 62 of the protective device 10, which is in circuit with the lower stud or cathode terminal of diode unit 14 is preferably coupled directly to the main frame of the machine, as indicated by the ground connection 102 in FIGURE 4. Conductors 27 and 32, as previously described, serve to join the diode unit 14 in series with the operating coil 29 of the overload protective device 15, or, more particularly, the mercury relay in the control circuit. Completion of circuit for the operating coil 29 to the negative power conductor L(—) is made over conductor 65 which joins the negative return line 87 as at junction 103.

As previusly noted, the diode unit 14 is intentionally selected of a size and rating sufficient to carry the full line energy supplied to the machine by the conductors of the trailing power cable. In the above-described electrical installation with a power supply of substantially 250–300 volts, 200 amps. D.C., diode unit 14 preferably constitutes a silicon diode rectifier having a rating of 400 amps. and 440 peak reverse voltage. It will be noted from FIGURE 4 that one or more of the diode units 14 may be employed in parallel circuit relationship, as indicated by dotted lines at 14a, to accommodate the power supply values. Still further modification of the ground fault circuit is contemplated, as previously described, whereby the diode unit 14 may be located, as indicated by dotted lines position 14b, between the operating coil 29 for the overload protective device 15 and the negative return conductor 87. It is preferred, however, in order to insure positive connection of the ground fault diode with the framing of the mining machine, that the stud end portion 25 thereof be joined substantially directly to the machine frame 71, as indicated by the full line showing of unit 14 in FIGURE 4.

Of further consequence to the successful protection of operating personnel according to the circuit and protective system illustrated in FIGURE 4, the overload protective device 15 is preferably selected to operate at a reasonably low value of ground fault energy flowing through the ground fault circuit. Thus, by way of example, the operating value for opening the contacts of the protective device 15 may be in the order of 70 amps. In this respect, it will be recalled that the mercury relay, as hereinabove described and illustrated in the drawings, is a normally closed, quick-opening type, capable of adjustment, so that in the presence of substantially 70 amp. current flow in the operating coil 29 and over the ground fault circuit from the machine frame 71 to the negative power cable conductor L(—), will cause the mercury relay to quickly open its normally closed contacts and thereby deenergize the control circuit. Deenergization of the control circuit automatically results in a prompt shut-down of the machine by deenergizing the operating coils 80 and 90 and thereby opening the operating circuit relay contacts 79 and 89.

It is also to be noted that a mercury relay has been specified hereinabove as preferred for the overload protective device 15. However, the same way constitute an electro-mechanical type relay, but, in that event, the protective device must be enclosed in an explosion-proof box or enclosure, such as the control panel enclosure indicated at 94, particularly if underground mining machinery is involved, in order to avoid explosion hazard. For the same reason, it may be preferable for the entire protective device 10 hereinabove described, including the ground fault unit 14, to be enclosed in such an explosion-proof box when the device and system of this invention are used in conjunction with underground mining machines. It is to be noted nevertheless, that by utilizing a mercury-type relay the circuit contacts thereof are completely enclosed in a hermetically sealed envelope and such therefore inherently avoids explosion hazard. In a like fashion, the diode units 13 and 14 do not present open contact situations since the same are likewise sealed units. Therefore, it is possible to utilize the protective device 10 of this invention without the mandatory resort to an explosion-proof enclosure since the various components thereof are self-sealed units which materially reduce explosion hazard by avoiding open sparks or arcing contacts.

In order to promote safety in the operation and use of the protective device and system hereinabove described, it is preferred, as above noted, that the ground fault silicon diode unit or semi-conductor 14 have a forward current rating of substantially 400 amps. and a peak reverse voltage rating of substantially 400 volts. This provides sufficient safety margin, particularly as to sustained line energy loads through the ground fault diode; the line load typically being in the order of 250–300 volts and 220–250 amps. D.C. In a similar fashion, the rating of the power line fuses 75, 75 in the power cable conductor cables L(+) and L(−) preferably are of a size not substantially exceeding 150% of the continuous current rating for diode unit 14. If a circuit breaker is used instead of a line fuse, the instantaneous trip setting thereof need not exceed 300% of the continuous current rating for diode unit 14. Thus, for example, if a single 400 amp. forward current diode 14 is used, the main line fuse 75 would be in the order of 600 amps., or an instantaneous circuit breaker would be set to open at a value of substantially 1200 amps. Smaller fuses and lower circuit breakers, of course, are permitted to achieve a greater safety advantage.

The above-noted relationship between the main line circuit breakers or fuses and the rating of the ground fault diode unit is important primarily because it will be recalled the ground fault circuit of the improved device and protective system of this invention is intentionally adapted to carry the full line power supplied to the machine over the trailing cable conductors. This feature becomes exceedingly important in the event of application of full line energy to the frame 71 of the machine, in which eventuality the ground fault circuit and, more particularly, the diode unit 14 thereof, must effectively provide a direct short between conductors of the supply cable. While the machine itself would be deenergized prior to such a condition by virtue of the opening of the mercury relay contacts of the overload protective device 15, at a level of 70 amp. ground fault current in the above-described situation, nevertheless the application of full line energy to the machine frame in excess of the 70 amp. current value would be recognizedly dangerous to a human coming into contact therewith. By providing a means for effectively short-circuiting the power cable conductors according to this invention, the line fuses or circuit breakers will be blown quickly to deenergize the power cable, and thus isolate the main frame of the machine from the power source to which the trailing power cable is joined.

From the foregoing it is believed that those familiar with the art will readily appreciate and understand that the improved protective device and system of the present invention afford novel means departing from previously known protective devices and systems of this class in the prior art. It will further be recognized that the improvements of this invention provide simple and operationally dependable means for protecting both equipment and personnel from the hazards of ground fault energy, with the specified semi-conductor diodes being especially adapted for the rugged conditions of use and operation encountered, particularly with underground mining equipment. Further, while the herein disclosed invention has been described and related to a specific preferred embodiment thereof illustrated in the accompanying drawings, those familiar with the art will readily appreciate that the same is susceptible to various changes, modifications and substitutions of equivalents without departing from the spirit and scope of this invention. Consequently it is intended that the present invention be unlimited by the foregoing writings, except as may appear in the following appended claims.

I claim:

1. An electrical system for protecting operating personnel and D.C. powered equipment having electrically conductive frame means from the hazards of ground fault energization of said frame means and for preventing reverse polarity energization of the equipment, comprising a two-conductor power cable means connected to a D.C. energy source over overload circuit protective means, input and output terminal means on the equipment each connected with one of the conductors of said power cable, an operating circuit connected to said terminal means and the powered equipment and having normally open relay operated switch means therein adapted to be actuated to closed position to energize said operating circuit, a control circuit connected to said terminal means in parallel circuit relationship wtih said operating circuit and including, in series, control switch means, an overload protective device having normally closed circuit-making contacts, a semi-conductor device conductive of electrical energy of a predetermined polarity for preventing reverse polarity energization of the control circuit, and operating coil means operable upon energization of said control circuit to close said switch means in the said operating circuit; and a normally denergized ground fault circuit connected between the equipment frame means and one of said power cable conductors for transmitting ground fault energy uninterruptedly from said frame means to the energy source over said one conductor; said ground fault circuit comprising, in series, a ground fault semi-conductor device unidirectionally conductive of electrical energy of a predetermined polarity and operating coil means adapted when energized by predetermined values of said ground fault energy to open the normally closed contacts of said overload protective device in said control circuit to deenergize the latter circuit and said operating coil therein thereby to open said operating circuit switch means.

2. The combination as set forth in claim 1 wherein the overload circuit protective means coupled to said power cable conductors comprise fuse means having a rating substantially 150% of the forward current rating for said ground fault semi-conductor device.

3. The combination as set forth in claim 1 wherein said overload protective means coupled to said power cable conductors comprise instantaneous circuit breaker means having an instantaneous trip setting substantially 300% of the forward current rating for the ground fault semi-conductor device.

4. The combination as set forth in claim 1 wherein each of said semi-conductor devices constitutes a silicon diode rectifier with the said diode in said ground fault circuit being of a size sufficient to withstand the full line energy values supplied to said equipment over said power cable.

5. An electrical system for use in protecting operating personnel of D.C. powered equipment having electrically conductive frame means from the hazards of explosion and ground fault energization of said frame means and for preventing reverse polarity energization of the equipment, comprising a two-conductor power cable connected to a D.C. energy source over line fuse protective means, an operating circuit connected to the conductors of the power cable for energizing the powered equipment and including normally open switch means isolating the equipment from the power source, a control circuit electrically connected to said power cable conductors in parallel circuit relation with said operating circuit and comprising, in series, control switch means, an overload protective device having normally closed circuit making contacts, a semi-conductor device conductive of electrical energy of a predetermined polarity preventing reverse polarity energization of said control circuit and electrically responsive means adapted, when energized, to close the switch means of said operating circuit; a normally deenergized ground fault circuit electrically connected between the equipment frame means and one of said power cable conductors for transmitting ground fault energy uninterruptedly from said frame means to said energy source over said one conductor; said ground fault circuit comprising, in series, ground fault semi-conductor means conductive of electrical energy of a predetermined polarity and thereby controlling the transmission of electrical energy unidirectionally from said frame means to said one conductor and operating means adapted to open the normally closed contacts of said overload protective device in response to the transmission of preselected values of ground fault energy over said ground fault circuit; and explosion-proof enclosure means enclosing said overload protective device and said semi-conductor device and means.

6. The combination as set forth in claim 5 wherein said semi-conductor device comprises a silicon diode rectifier and said semi-conductor means comprises plural silicon diode rectifiers; said overload protective device comprising a mercury relay including said normally closed, quick-opening contacts connected in said control circuit and an operating coil therefor which constitutes the electrically responsive means in said ground fault circuit, and adjustment means operatively associated with said mercury relay for determining the value of ground fault energy requisite to actuate said operating coil to open said contacts thereof.

7. Protective means for use wtih electrical equipment mounted on electrically conductive frame means and powered over a control circuit connected to a two conductor supply cable connected to a source of D.C. energy comprising: an overload protective device having normally closed contact means connected in the control circuit and operatively actuated by associated electrically responsive operating means which, when energized by electrical energy of predetermined value actuates to open said contact means to deenergize said control circuit and the equipment; semi-conductor means operatively conductive of D.C. energy of a single predetermined polarity, and a normally deenergized ground fault circuit means electrically connecting said semi-conductor means with the equipment frame, said operating means and one of the conductors of the supply cable in a manner whereby said ground fault circuit means conducts ground fault energy unidirectionally from said frame to said one conductor according to the conductive polarity of said semi-conductor means; the energization of said ground fault circuit means by ground fault energy of said predetermined value causing said operating means to responsively actuate to open said contact means in said control circuit.

8. The combination of claim 7 including additional semi-conductor means in the said control circuit for the equipment; said additional semi-conductor means being conductive of electrical semi-conductor means being conductive of electrical energy of said single predetermined polarity and arranged in said control circuit whereby the latter and the equipment are energized by D.C. energy complying with the polarity of said additional semi-conductor means.

9. The combination of claim 8 wherein each said semi-conductor means comprises a silicon diode rectifier, and said protective device comprises a mercury relay having quick opening contacts constituting said normally closed contact means in said control circuit and an operating coil comprising the said operating means in said ground fault circuit means; and adjustment means operatively associated with said relay for selectively setting the value of ground fault energy required to open said contacts thereof.

10. The combination set forth in claim 7 wherein said semi-conductor means comprises a plurality of semi-conductor diode devices electrically coupled in parallel circuit relation in said ground fault circuit means.

11. In portable electric equipment having a D.C. motor mounted on an electrically conductive frame and powered by D.C. energy over a two conductor cable connected to a D.C. energy source, a control circuit controlling energization of said motor and comprising normally closed contact means of an overload protective device actuated by a current responsive operating coil, and in series circuit therewith, a semi-conductor device conductive of D.C. energy of a single predetermined polarity which substantially prevents reverse polarity energization of the control circuit and motor; and a ground fault circuit connected between said frame and one conductor of said cable and comprising, said operating coil of said overload protective device, and in series circuit therewith, a second semi-conductor device, conductive of energy of said predetermined polarity, connected in said ground fault circuit to control energization thereof by energy flowing unidirectionally from said frame to said one conductor; the said operating coil operatively opening said contact means in response to energization of said ground fault circuit by energy of a preselected maximum value.

References Cited by the Examiner

UNITED STATES PATENTS 1,324,903 12/1919 Klink _____ 317—9
2,554,598 5/1951 Storch _____ 317—18.3
3,051,887 8/1962 Lind _____ 307—127 X

FOREIGN PATENTS 662,878 12/1951 Great Britain.

SAMUEL BERNSTEIN, *Primary Examiner.*

R. V. LUPO, *Assistant Examiner.*